United States Patent [19]
Ackermann et al.

[11] Patent Number: 5,251,730
[45] Date of Patent: Oct. 12, 1993

[54] ADJUSTABLE VIBRATION DAMPER

[75] Inventors: Norbert Ackermann; Hubert Beck, both of Eitorf, Fed. Rep. of Germany

[73] Assignee: Boge Aktiengesellschaft, Eitorf, Fed. Rep. of Germany

[21] Appl. No.: 916,065

[22] Filed: Jul. 17, 1992

[30] Foreign Application Priority Data

Jul. 31, 1991 [DE] Fed. Rep. of Germany ....... 4125316

[51] Int. Cl.$^5$ ............................ F16F 9/46; F16F 9/34
[52] U.S. Cl. .................... 188/299; 188/318; 188/322.13; 251/359
[58] Field of Search .............. 188/299, 318, 322.13, 188/322.14, 322.15, 285; 251/359

[56] References Cited

U.S. PATENT DOCUMENTS

| | | | |
|---|---|---|---|
| 1,783,884 | 12/1930 | Lee | 251/359 |
| 2,402,950 | 7/1946 | Culver et al. | 251/359 |
| 4,291,787 | 9/1981 | Brentham | 188/318 |
| 4,424,953 | 1/1984 | Takagi et al. | 251/359 X |
| 4,854,429 | 8/1989 | Casey | 188/322.15 X |
| 4,880,086 | 11/1989 | Knecht et al. | 188/299 |
| 4,960,188 | 10/1990 | Wossner | 188/299 |
| 5,011,113 | 4/1991 | Stobbs et al. | 251/359 |
| 5,056,556 | 10/1991 | Nishimoto et al. | 251/359 |
| 5,078,240 | 1/1992 | Ackermann et al. | 188/285 |

FOREIGN PATENT DOCUMENTS

| | | | |
|---|---|---|---|
| 3835705 | 4/1990 | Fed. Rep. of Germany . | |
| 886961 | 10/1943 | France | 251/359 |
| 2223822 | 4/1990 | United Kingdom | 188/299 |

Primary Examiner—George E. A. Halvosa
Attorney, Agent, or Firm—Nils H. Ljungman & Associates

[57] ABSTRACT

An adjustable vibration damper for motor vehicles has a cylinder containing a damping fluid, an axially-movable piston rod projecting into the cylinder in a sealed manner, and a damping piston fastened to the piston rod to divide the cylinder into two work chambers, whereby a damping valve equipped with an axially movable valve body and a valve seat controls the effective cross section of a damping passage. For this purpose, the valve body, starting from its pressurized end surface, has at least one constant throttle cross section running toward the back side of the valve body, and an additional throttle passage running in the outflow direction, whereby a pilot control element for regulating flow through the additional throttle passage is located in a recess inside the valve body.

17 Claims, 5 Drawing Sheets

ADJUSTABLE VIBRATION DAMPER

BACKGROUND OF THE INVENTION

1. Field of the Invention

This invention relates to an adjustable vibration damper, in particular, for automotive vehicles. The adjustable vibration damper has a cylinder containing a damping fluid, an axially-movable piston rod projecting into the cylinder in a sealed manner, a damping piston fastened to the piston rod, which damping piston divides the cylinder into two work chambers, and a damping valve equipped with a valve seat. The damping valve, by means of an axially movable valve body, controls the effective cross section of a damping passage connecting the two work chambers of the cylinder. The valve body, starting from its pressurized end surface has at least one passage having a constant throttle cross section, which passage runs from the pressurized end surface toward the back side of the valve body, located on the other end. In addition, the valve body also has a throttle passage running in the outflow direction, which throttle passage is controlled by an axially movable, continuously positionable pilot control element.

2. Background Information

German Patent No. DE-PS 37 19 113, which corresponds to U.S. Pat. No. 4,880,086, and German Laid Open Patent Application No. DE-OS 38 35 705 disclose hydraulically adjustable vibration dampers, the damping force of which can be continuously adjusted in both the tension and compression direction. For this continuous adjustment, a damping valve having an axially movable valve body and a valve seat controls the effective cross section of a damping passage. The throttle cross section of the damping passage is thereby controlled by an axially movable, continuously positionable control needle which interacts with the valve body. However, one disadvantage of such an arrangement is that the need for additional flow connections and partitions between the valve body and the pilot control element increases the size of the overall system.

OBJECT OF THE INVENTION

The object of the invention is to create a vibration damper with a two-stage damping valve, in which the damping valve can be manufactured economically, has a low overall height and consists of essentially only a few parts, most of which parts are extremely simply to manufacture.

SUMMARY OF THE INVENTION

This object is achieved by the present invention, in that the pilot control element is located within a recess formed inside the valve body.

One advantage of this configuration is that, a pilot-controlled valve, having a self-supplied pilot stage can be used to control and regulate the damping medium in the vibration damper. To achieve this, the pressure difference which generates the damping force can be used to adjust the valve body. As a result of the installation of the pilot control element and the corresponding flow connections inside the valve body, an economical module can be manufactured, which module can consist of only a few, easily manufactured parts, but which module can still have a low overall height.

In accordance with an additional essential characteristic of the present invention, the pilot control element is preferably a ball.

In one configuration of the present invention, the pilot control element, which is axially movable in the valve body, can preferably be supported on the armature of an electromagnet by means of a connecting element.

In a additional favorable embodiment of the present invention, the valve body and the armature can be located so that they are axially movable in a common hole, or bore, within the valve. The valve body and the armature thereby can advantageously have the same outside diameter in the vicinity of their outside guide surfaces.

In accordance with an additional characteristic of the present invention, the valve body can consist of several pieces.

In an embodiment which is favorable from a manufacturing point of view, the valve body can consist of at least one molded piece that is preferably formed so that it requires no additional cutting.

In accordance with an additional essential characteristic, the valve seat of the valve body and/or the valve seat of the pilot control element can be formed by built-in discs having a high hardness.

In one further configuration of the present invention, a pressurized differential surface can be formed between the valve seat of the pilot control element and the outer guide surface of the connecting element.

In one favorable embodiment, the throttle cross section can have two segments which are connected by means of a chamber, whereby the segments preferably have different cross sections.

In summary, one aspect of the invention resides broadly in an adjustable vibration damper for motor vehicles, the adjustable vibration damper comprising: a cylinder, damping fluid disposed within the cylinder, a piston rod projecting into the cylinder and movable axially within the cylinder, a damping piston fastened to the piston rod to divide the cylinder into a first chamber and a second chamber, fluid communication device for providing communication of damping fluid between the first and the second chambers; and a damping valve for regulating flow of the damping fluid through the fluid communication device. The damping valve comprises: a fluid inlet, a fluid outlet, a valve seat, a first displaceable component for opening and closing against the valve seat to vary the cross-section of the fluid communication device between the fluid inlet and the fluid outlet, the first displaceable component having a first end portion for being disposed against the valve seat and a second end portion disposed opposite the first end portion, at least one first, constantly open, bypass orifice disposed from the first end portion to the second end portion for bypassing damping fluid from the first end portion at least to the second end portion, the first displaceable component defining a recess therein, a second bypass orifice being disposed in the first displaceable component, the second bypass orifice being disposed from the first end portion to the fluid outlet, a second displaceable component for varying flow of damping fluid through the second bypass orifice, the second displaceable component being disposed within the recess in the first displaceable component.

Another aspect of the invention resides broadly in an adjustable vibration damper for motor vehicles, the damper comprising a cylinder assembly having an arrangement for varying damping of a piston assembly disposed therein, the piston assembly having a piston rod and piston for dividing the cylinder into at least two chambers, each for containing damping fluid, the vibration damper comprising: a device for bypassing damping fluid between the at least two chambers; and a damping valve device for regulating flow of the damping fluid in the bypassing device. The damping valve device comprises: a fluid inlet, a fluid outlet, a principal valve seat, a first displaceable component having a first portion for being disposed against the principal valve seat and a second portion opposite the first portion, the first portion for moving towards and away from the principal valve seat to regulate flow of damping fluid from the fluid inlet to the fluid outlet by bypassing pressure buildup at the first surface to the fluid outlet; at least one first constantly open bypass orifice disposed at least in the first displaceable component for bypassing pressure build up at the first portion at least to the second portion of the first displaceable component, a second bypass orifice disposed within the first displaceable component for bypassing pressure buildup at the first portion to the fluid outlet, the second bypass orifice comprising a recess within the first displaceable component, and a second displaceable component disposed within the recess in the first displaceable component for varying flow of damping fluid through the second bypass orifice, the first displaceable component and the second displaceable component being independently displaceable relative to each other.

BRIEF DESCRIPTION OF THE DRAWINGS

Preferred embodiments of the present invention are schematically illustrated in the accompanying drawings, in which.

DESCRIPTION OF THE PREFERRED EMBODIMENTS

Figure 1:
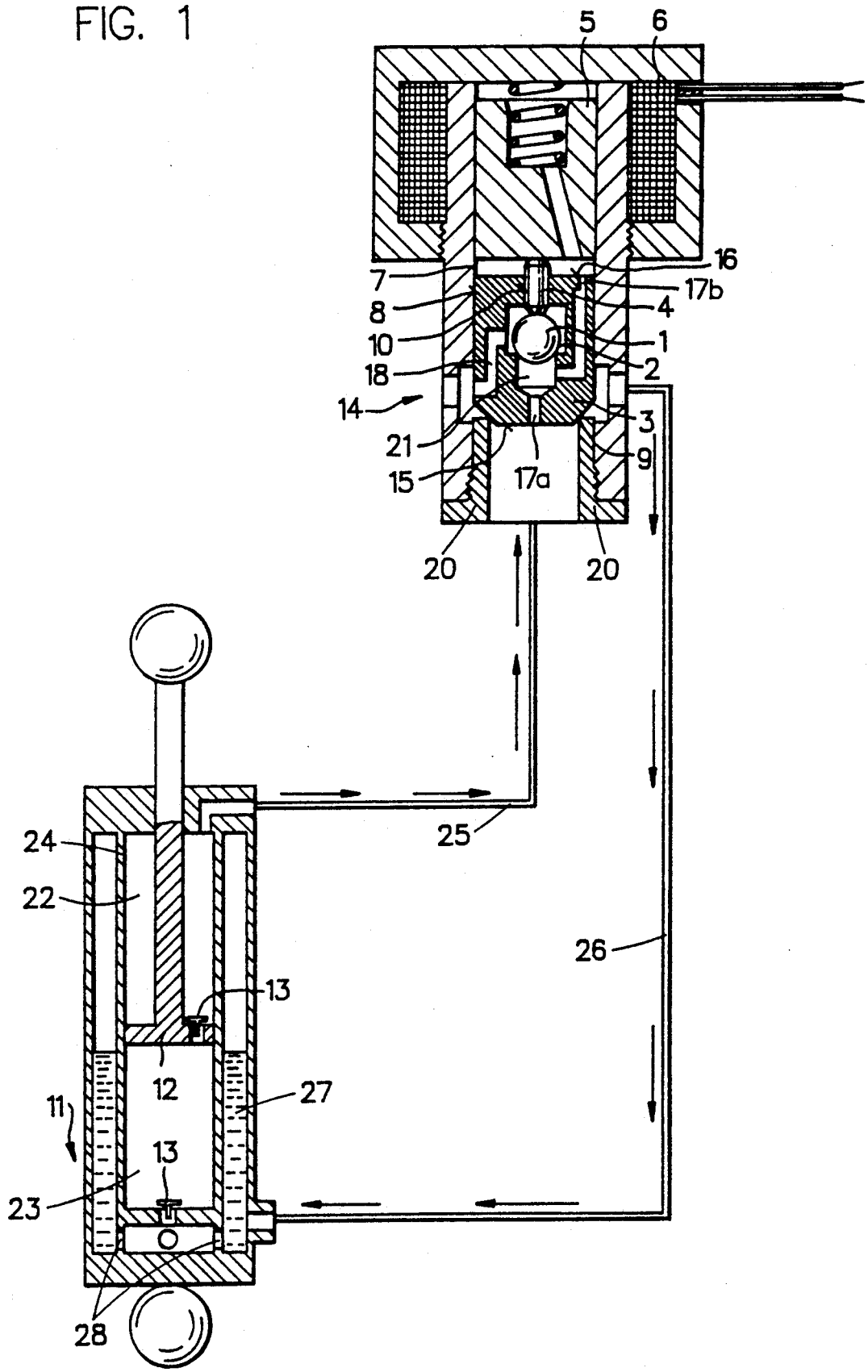
FIG. 1 shows a vibration damper, in cross section, with an external damping valve.

The embodiment illustrated in FIG. 1 shows a vibration damper 11 consisting of a piston 12, which piston 12 divides the work chamber 24 into two chambers 22 and 23. Check valves 13 essentially guarantee that the damping fluid will flow to damping valve 14 in only one direction. The damping fluid thereby flows out of damper 11 along connection 25 to the damping valve 14, through the damping valve 14 and back to the damper 11 along connection 26, and into equalization chamber 27. From equalization chamber 27, the damping fluid can return to the chamber 23 through orifices 28 and a check valve 13.

The damping valve 14 preferably consists of the valve body 3, in the recess 2 of which there is preferably a pilot control element 1, which pilot control element 1 can be in the shape of a ball. The pilot control element 1 can preferably be connected to an armature 5 of an electromagnet 6 by means of a connecting element 4. To simplify the manufacturing process, the armature 5 can preferably be located in the boring 7, to be guided by the guide surfaces 8 which are important for the valve body 3.

The valve body 3 forms a valve seat 9 through which the main current of the damping medium flows when the valve body 3 is open. The cross section of the passage at the valve seat 9 between the valve body 3 and the sleeve 20 can be defined by means of the pilot control element 1. For this purpose, the valve body 3, starting from its pressurized end surface 15, has a passage defined by passage segments 17a and 17b, which passage has a constant throttle cross section running toward the back end 16, located on the other end of the valve body. Starting from the recess 2, the valve body also preferably has an additional passage 18 in the outflow direction, through which passage 18, flow of damping medium is controlled by pilot control element 1. As a result of the corresponding pressure conditions on the front end surface 15 and on the back end 16, the pilot control element 1 can be continuously displaced axially, so that an appropriate cross section and thus an appropriate damping force are set between the valve body 3 and the sleeve 20.

Figure 2:
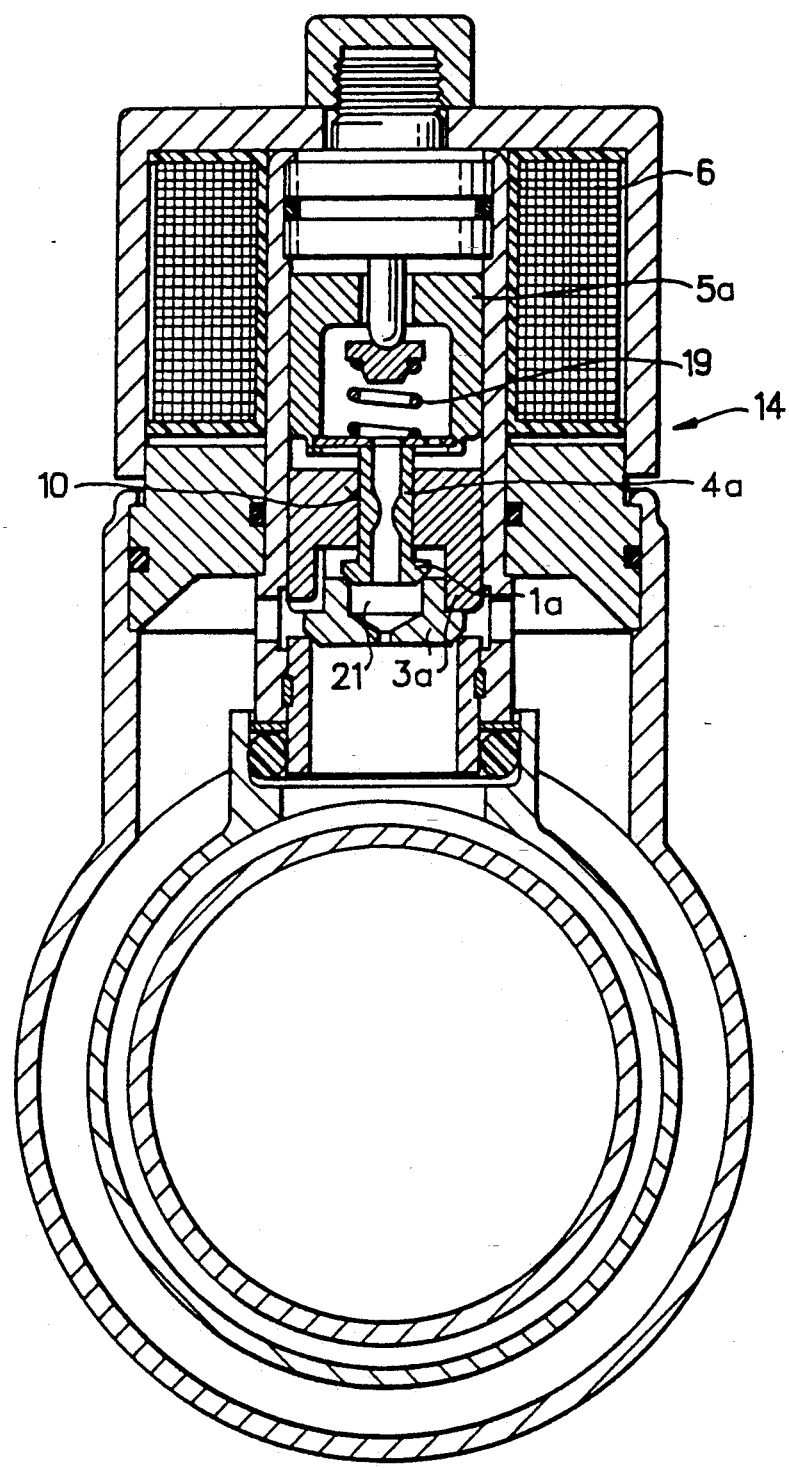
FIG. 2 shows a cross section through a vibration damper with a damping valve located laterally on the vibration damper.

FIG. 2 shows an additional embodiment of a damping valve 14. In this embodiment, the valve body 3a can preferably be made from two parts, and can have a hollow cylindrical element as the pilot control element 1a. Thus, in this embodiment, the valve body 3a can be designed in two parts, while the pilot control element 1a can be manufactured as a single piece in conjunction with the connecting element 4a. The armature 5a of the electromagnet 6 can in turn be directly connected by means of the connecting element 4a to the pilot control element 1a. The spring 19, in the base position, preferably exerts a corresponding force on the connecting element 4a.

Figure 3:
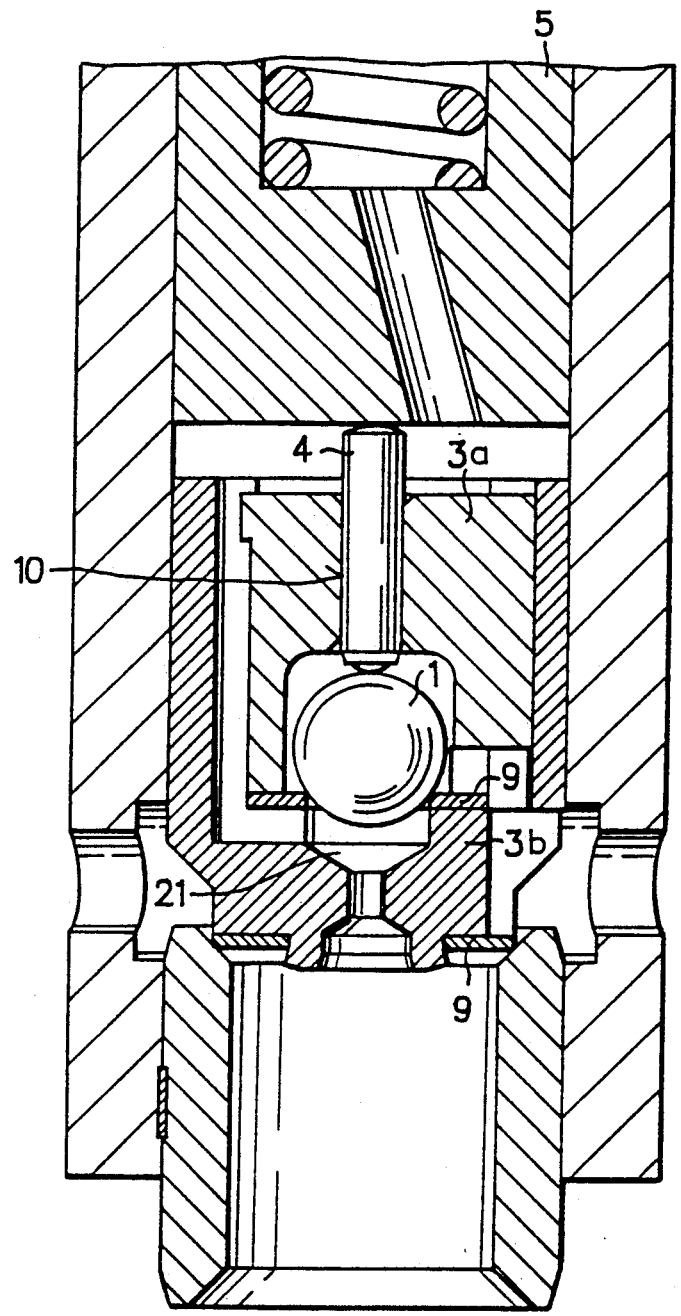
FIG. 3 shows, on an enlarged scale, a valve body with a pilot control element.

FIG. 3 also shows an armature 5, which armature 5 acts by means of the connecting element 4 on the pilot control element 1, which is in the form of a ball. The valve body 3 can thereby be designed in several parts and can consist of appropriate moldings which can be manufactured using powder metallurgy technology. The valve seat 9 for the pilot control element 1 and the valve body 3 can be manufactured from discs having a high hardness, and can also be manufactured as punched parts, for example.

Figure 4:
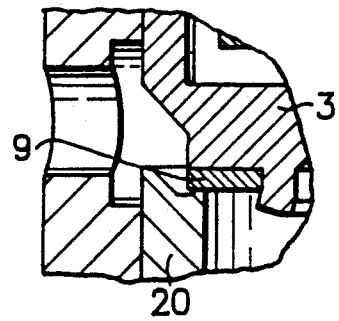
FIG. 4 shows detailed view of a valve seat of the valve body.

FIG. 4 shows a detail of the valve body 3, which is calked with the disc so that the latter acts as a valve seat 9, whereby the cylindrical ring 20 works together with the valve sea 9 by means of a control edge, or flange.

Figure 5:
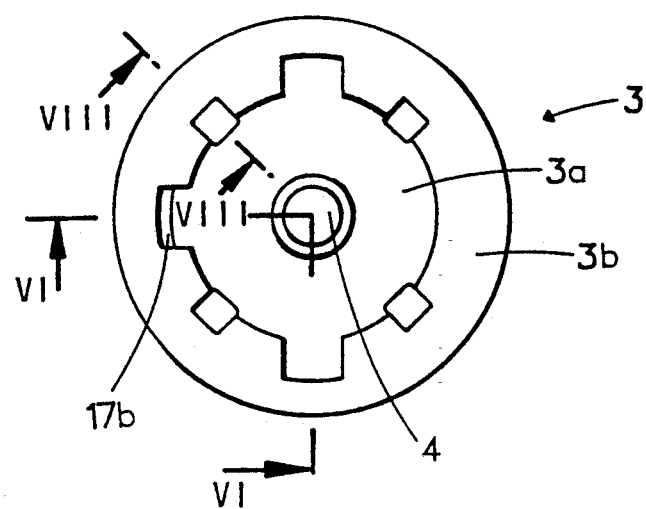
FIG. 5 shows an end view of an additional embodiment of a valve body.
Figure 6:
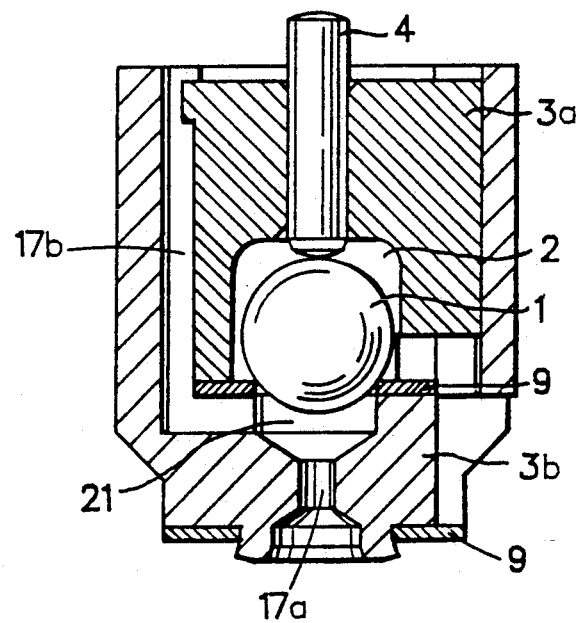
FIG. 6 shows a cross sectional view of the valve body of FIG. 5 taken along line VI—VI.
Figure 7:
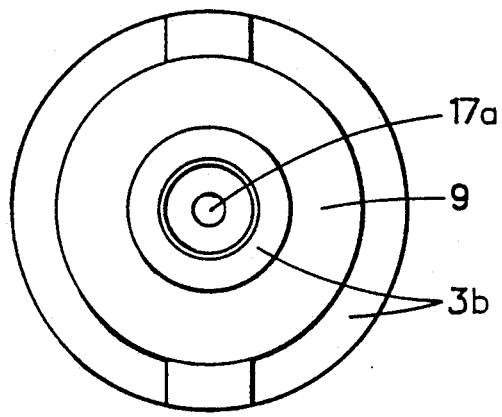
FIG. 7 show an opposite end view of the valve body of FIG. 6.
Figure 8:
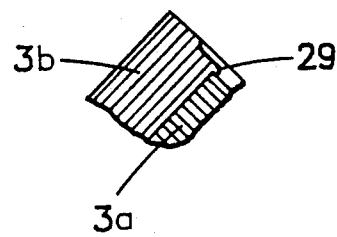
FIG. 8 shows a detailed partial cross section of the valve body of FIG. 5 taken along the line VIII—VIII.

FIG. 5 shows one end view of the two-piece valve body 3 in a recess 2 of which the pilot control element 1 and the connecting element 4 are housed. A cross section of the two-piece valve body 3 taken along the line VI—VI is shown in FIG. 6. An end view of the opposite end is shown in FIG. 7, and a detailed partial cross section of the valve body 3 taken along the line VIII—VIII is shown in FIG. 8. This view in FIG. 8 essentially shows a site at which the two pieces of the valve body 3a and 3b are calked together by means of the flange 29 of valve body 3b, which flange extends over and thereby maintains the part 3a within the part 3b. The valve seat 9 can preferably be a disc, whereby the individual parts can preferably be inserted into one another and calked or pressed together. The entire valve body can thereby be formed simply by placing the control 1 into the recess 2 inside body piece 3a, placing the disc 9 thereon and calking the disc in place, and then inserting the entire assembled piece 3a into the body piece 3b and calking the entire assembly together.

One feature of the invention resides broadly in an adjustable vibration damper for automotive vehicles with a cylinder containing a damping fluid, an axially-movable piston rod projecting into it in a sealed manner, and a damping piston fastened to the piston rod dividing the cylinder into two work chambers, and a damping valve equipped with a valve seat which, by means of an axially movable valve body, controls the effective cross section of a damping passage, whereby the valve body, starting from its pressurized end surface has at least one constant throttle cross section running toward the back side located on the other end, and a throttle passage running from the back side in the outflow direction is controlled by an axially movable, continuously positionable pilot control element, characterized by the fact that the pilot control element 1 is located in a recess 2 inside the valve body 3.

Another feature of the invention resides broadly in a vibration damper characterized by the fact that the pilot control element 1 is a ball.

Yet another feature of the invention resides broadly in a vibration damper characterized by the fact that the pilot control element 1 which can move axially in the valve body 3 is supported by means of a connecting element 4 on the armature 5 of an electromagnet 6.

Still another feature of the invention resides broadly in a vibration damper characterized by the fact that the valve body 3 and the armature 5 are located so that they can move axially in a common hole or boring 7.

Another feature of the invention resides broadly in a vibration damper characterized by the fact that the valve body 3 and the armature 5 have the same outside diameter in the vicinity of their external guide surfaces 8.

Yet another feature of the invention resides broadly in a vibration damper characterized by the fact that the valve body is designed in several parts.

Another feature of the invention resides broadly in a vibration damper characterized by the fact that the valve body 3 consists of at least one molding formed without cutting.

Still another feature of the invention resides broadly in a vibration damper characterized by the fact that the valve seat 9 of the valve body 3 and/or of the pilot control element 1 is formed by built-in discs having a high hardness.

Another feature of the invention resides broadly in a vibration damper characterized by the fact that a pressurized differential surface is formed between the valve seat 9 of the pilot control element 1 and the external guide surface 10 of the connecting element.

Yet another feature of the invention resides broadly in a vibration damper characterized by the fact that the throttle cross section 17 has two segments 17a and 17b, which are connected by a chamber 21.

Another feature of the invention resides broadly in a vibration damper characterized by the fact that the segments 17a and 17b have different cross sections.

An example of an adjustable vibration damper can be found in U.S. Pat. No. 4,880,086 to Heinz Knecht and Norbert Ackerman.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. An adjustable vibration damper for motor vehicles, said adjustable vibration damper comprising:
   a cylinder;
   damping fluid disposed within said cylinder;
   a piston rod projecting into said cylinder, said piston rod being movable axially within said cylinder;
   a damping piston fastened to said piston rod, said damping piston for dividing said cylinder into a first chamber and a second chamber;
   fluid communication means for providing communication of damping fluid between said first and said second chambers;
   a damping valve for regulating flow of the damping fluid through said fluid communication means, said damping valve comprising:
   a fluid inlet;
   a fluid outlet;
   a valve seat;
   a first displaceable component for opening and closing against said valve seat to vary the cross-section of said fluid commutation means between said fluid inlet and said fluid outlet;
   said first displaceable component having a first end potion for being disposed against said valve seat and a second end portion disposed opposite said first end portion;
   at least one first, constantly open, bypass orifice disposed from said first end portion to said second end portion for bypassing damping fluid from said first end portion at least to said second end portion;
   said first displaceable component defining a recess therein;
   a second bypass orifice being disposed in said first displaceable component, said second bypass orifice being disposed from said first end portion to said fluid outlet;
   a second displaceable component for varying flow of damping fluid through said second bypass orifice, said second displaceable component being disposed within said recess in said first displaceable component;

an electromagnet, said electromagnet comprising a moveable armature, said armature having a first end disposed adjacent said first displaceable component and a second end opposite said first end;

connecting means for connecting said second displaceable component to said armature for movement of said second displaceable component with said armature;

said connecting means has an exterior surface;

said first displaceable component comprises a first bore through which said connecting means passes, said first bore having an internal surface for being disposed adjacent the external surface of the connecting element; and said internal surface of said first bore and said external surface of said connecting means form a pressurized differential surface therebetween.

2. The vibration damper according to claim 1, wherein said damping valve further defines a second bore therein, said armature and said first displaceable component being disposed within said second bore for movement of said armature and said first displaceable component toward and away from said valve seat.

3. The vibration damper according to claim 2, wherein:

said first displaceable component and said armature each have at least one external surface for guiding said first displaceable component and said armature within said second bore;

said at least one external surface of each of said first displaceable component and said armature define an outside diameter; and the outside diameter of said first displaceable component is essentially equal to the outside diameter of said armature.

4. The vibration damper according to claim 3, wherein said first displaceable component comprises at least two parts.

5. The vibration damper according to claim 4 wherein:

said first end portion of said first displaceable component comprises a valve seat portion for being disposed adjacent said valve seat;

said first displaceable component comprises an additional valve seat therein, said additional valve seat for being contacted by said second displaceable component; and at least one of said valve seat portion of said first displaceable component and said additional valve seat for said second displaceable component comprising discs having a high hardness.

6. The vibration damper according to claim 5, wherein said first bypass orifice comprises:

a first section adjacent said first end portion;

a second section adjacent said second end portion; and a third section connecting said first section to said second section, said third section comprising a chamber.

7. The vibration damper according to claim 6, wherein said first section has a cross section and said second section has a cross section, said cross section of said second section being different from said cross section of said first section.

8. The vibration damper according to claim 7, further including:

check valves for enabling movement of said damping fluid in a first direction only within said vibration damper, said fluid communication means and said damping valve; and a pressure equalization chamber for receiving damping fluid from said damping valve.

9. The vibration damper according to claim 8, wherein:

said damping valve further comprises:

biasing means for biasing at least one of said first and said second displaceable components into a closed position to block passage of damping fluid from said fluid inlet to said fluid outlet;

said biasing means being disposed adjacent said second end of said armature; and a third bypass orifice disposed in said armature for bypassing pressure buildup of said damping fluid from said first end of said armature to said second end of said armature.

10. The damping valve according to claim 9, wherein said second displaceable component comprises a cylindrical tube having a first end and a second end, said cylindrical tube comprising:

said first bypass orifice; and a valve seat portion disposed adjacent the first end for varying said flow through said second bypass orifice.

11. The vibration damper according to claim 9, wherein, said second displaceable component comprises a ball.

12. The vibration damper according to claim 1, wherein said first displaceable component comprises at least one molded part, said at least one molded part being formed without cutting.

13. An adjustable vibration damper for motor vehicles, said adjustable vibration damper comprising:

a cylinder;

damping fluid disposed within said cylinder;

a piston rod projecting into said cylinder, said piston rod being movable axially within said cylinder;

a damping piston fastened to said piston rod, said damping piston for dividing said cylinder into a first chamber and a second chamber;

fluid communication means for providing communication of damping fluid between said first and said second chambers;

a damping valve for regulating flow of the damping fluid through said fluid communication means, said damping valve comprising:

a fluid inlet;

a fluid outlet;

a valve seat;

a first displaceable component for opening and closing against said valve seat to vary the cross-section of said fluid communication means between said fluid inlet and said fluid outlet;

said first displaceable component having a first end portion for being disposed against said valve seat and a second end portion disposed opposite said first end portion;

at least one first, constantly open, bypass orifice disposed from said first end portion to said second end portion for bypassing damping fluid from said first end portion at least to said second end portion;

said first displaceable component defining a recess therein;

a second bypass orifice being disposed in said first displaceable component, said second bypass orifice being disposed from said first end portion to said fluid outlet;

a second displaceable component for varying flow of damping fluid through said second bypass orifice, said second displaceable component being disposed within said recess in said first displaceable component;

said second displaceable component comprises a cylindrical tube having a first end and a second end, said cylindrical tube comprising:
said first bypass orifice; and
a valve seat portion disposed adjacent the first end for varying said flow through said second bypass orifice;

said damping valve has a longitudinal bore defined therein;

said first displaceable component is movable axially within said longitudinal bore;

said first displaceable component comprises a second longitudinal bore therein;

said cylindrical tube is disposed within said second longitudinal bore; and said damping valve further comprises:
an electromagnet disposed adjacent said second end of said first displaceable component, said electromagnet comprising a movable armature, said movable armature having a first end disposed adjacent said second end of said first displaceable component, and a second end disposed opposite said first end;

said movable armature being connected to said second end of said cylindrical tube for connecting said second displaceable component to said armature for movement of said second displaceable component with said armature.

14. The damping valve according to claim 13, wherein:
said damping valve comprises biasing means for biasing at least one of said first and said second displaceable components into a closed position against a pressure buildup of said damping fluid from said vibration damper; and
said armature comprises a third bypass orifice for bypassing damping fluid from said first end of said armature to said second end of said armature to thereby bypass pressure buildup at said first end portion of said first displaceable component to said second end of said armature through said first and said third bypass orifices.

15. An adjustable vibration damper for motor vehicles, said damper comprising a cylinder assembly having an arrangement for carrying damping of a piston assembly disposed therein, said piston assembly having a piston rod and piston for dividing said cylinder into at least two chambers, each of said at least two chambers for containing damping fluid, said vibration damper comprising:
means for bypassing damping fluid between said at least two chambers;
damping valve means for regulating flow of said damping fluid in said bypassing means;
check valves for allowing flow of damping fluid in a single direction within said vibration damper, said bypassing means, and said damping valve means;
means for accepting bypassed damping fluid from said bypassing means;

said means for accepting bypassing fluid comprises a tubular chamber disposed substantially abut said at least two chambers of said cylinder;

said means for accepting passing fluid being connected to one of said at least two chambers by a first connecting passage, said connecting passage comprising at least one of said check valves for allowing flow of damping fluid only from said means for accepting fluid to said one of said at least two chambers;

said piston means comprises a second connecting passage connecting said one of said at least two chambers to the other of said at least two chambers, said second connecting passage comprising at least one of said check valves for allowing fluid flow from said one of said at least two chambers to the other of said at least two chambers; and said damping valve means comprising:
a fluid inlet;
a fluid outlet;
a principal valve seat;
a first displaceable component having a first portion for being disposed against said principal valve seat and a second portion opposite said first portion, said first portion for moving towards and away from said principal valve seat to at least partially regulate flow of damping fluid from said fluid inlet to said fluid outlet by bypassing pressure buildup at said first surface to said fluid outlet;
at least one first constantly open bypass orifice disposed at least in said first displaceable component for bypassing pressure buildup at said first portion at least to said second portion of said first displaceable component;
a second bypass orifice disposed within said first displaceable component for bypassing pressure buildup at said first portion to said fluid outlet, said second bypass orifice comprising a recess within said first displaceable component; and
a second displaceable component disposed within said recess in said first displace component for varying flow of damping fluid through said second bypass orifice, said first displaceable component and said second displaceable component being independently displaceable reactive to each other, the second displaceable component comprising a ball disposed within said recess of said first displaceable component;
an electromagnet, said electromagnet comprising a movable armature, said armature having a first end disposed adjacent said first displaceable component and a second end opposite said first end;
connecting means for connecting said second displaceable component to said armature for movement of said second displaceable component with said armature;
biasing means disposed adjacent said second end of said armature for biasing at least one of said first displaceable component and said second displaceable component into a closed position against said pressure buildup of said damping fluid;
a first bore, said armature and said first displaceable component being disposed within said bore for movement toward and away from said principal valve seat;
said first displaceable component comprising a second bore, said connecting means for being disposed within said second bore for movement of said second displaceable element within said recess;

said damping valve means comprises a cylindrical tube having a first end, a second end, and said first bore therein, said principle valve seat being disposed adjacent said first end of said tube, said electromagnet being disposed adjacent said second end of said tube, and said first displaceable component being disposed in said first bore for movement within said first bore in a longitudinal direction of said tube;

said first displaceable component comprises at least two parts, each of said at least two parts being maintained together by calking;

said first displaceable component comprises a second valve seat therein for being contacted by said second displaceable component;

said second valve seat comprises a disc having a high hardness;

said first displaceable component comprises a valve seat portion disposed at a first end of said first portion, said valve seat portion for contacting said principal valve seat, and said valve seat portion comprising a disc having high hardness; and said principal valve seat comprises a flange for being contacted by said valve seat portion of said first displaceable component to at least partially close off flow of damping fluid from said inlet to said outlet.

16. The adjustable vibration damper according to claim 15, wherein said damping valve means is an integral part of said vibration damper.

17. The adjustable vibration damper according to claim 15, wherein said damping valve means is a separate unit disposed outside the vibration damper.

* * * * *

UNITED STATES PATENT AND TRADEMARK OFFICE
CERTIFICATE OF CORRECTION

PATENT NO. : 5,251,730

DATED : October 12, 1993

INVENTOR(S) : Norbert ACKERMANN and Hubert BECK

It is certified that error appears in the above-indentified patent and that said Letters Patent is hereby corrected as shown below:

In column 2, line 9, after 'In', delete "a" and insert --an--.

In column 4, line 57, after 'valve', delete "sea" and insert --seat--.

In column 6, line 48, Claim 1, after 'fluid', delete "commutation" and insert --communication--.

In column 6, line 51, Claim 1, delete "potion" and insert --portion--.

In column 7, line 2, Claim 1, before 'armature,', delete "moveable" and insert --movable--.

In column 9, line 53, Claim 15, after 'for', delete "carrying" and insert --varying--.

In column 10, line 2, after 'substantially', delete "abut" and insert --about--.

UNITED STATES PATENT AND TRADEMARK OFFICE
CERTIFICATE OF CORRECTION

PATENT NO. : 5,251,730

DATED : October 12, 1993

INVENTOR(S) : Norbert ACKERMANN, et al

It is certified that error appears in the above-indentified patent and that said Letters Patent is hereby corrected as shown below:

In column 10, line 46, Claim 15, after 'displaceable', delete "reactive" and insert --relative--.

Signed and Sealed this

Twenty-sixth Day of July, 1994

Attest:

BRUCE LEHMAN

Attesting Officer     Commissioner of Patents and Trademarks